United States Patent
Morris et al.

(10) Patent No.: US 6,481,959 B1
(45) Date of Patent: Nov. 19, 2002

(54) GAS TURBINE DISK CAVITY INGESTION INHIBITOR

(75) Inventors: Mark C. Morris, Phoenix, AZ (US); William J. Howe, Chandler, AZ (US); Carl D. Wright, Chandler, AZ (US); Douglas P. Freiberg, Phoenix, AZ (US); Nnawuihe A. Okpara, Peoria, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/844,889

(22) Filed: Apr. 26, 2001

(51) Int. Cl.[7] ............................................. F04D 29/38
(52) U.S. Cl. ...................................... 415/115; 415/191
(58) Field of Search ................................ 415/115, 191; 416/97 R

(56) References Cited

U.S. PATENT DOCUMENTS

| | | |
|---|---|---|
| 1,819,864 A | 8/1931 | Bloomberg |
| 2,858,101 A | 10/1958 | Alford |
| 3,535,873 A | 10/1970 | Szydlowski |
| 3,609,057 A | 9/1971 | Radtke |
| 5,545,004 A | 8/1996 | Ho et al. |
| 5,996,331 A | 12/1999 | Palmer |
| 6,089,822 A | 7/2000 | Fukuno |
| 6,109,867 A | 8/2000 | Jacques Portefaix |

*Primary Examiner*—Edward K. Look
*Assistant Examiner*—Dwayne J. White
(74) *Attorney, Agent, or Firm*—Robert Desmond, Esq.

(57) ABSTRACT

A supplemental air cooling system for use in gas turbine engines to inhibit the ingestion of hot flow path gases into circumferential locations of turbine disk cavities is provided. The supplemental air cooling is provided through a simple set of cooling air holes located on each side of the turbine nozzle airfoil trailing edges, and proximately placed to be below the turbine nozzle structural element flow discouragers. Turbine disk cavity cooling purge air entering the disk cavity through the cooling air holes produces dynamic pressure cooling air jets which force the incoming hot ingestion air to turn circumferentially and go back out in the flow path before it enters the turbine disk cavity. The result is a decrease in hot gas ingestion, a reduction in disk rotor and static structural metal temperatures, a reduction in the amount of required cooling air flow, and enhanced performance of the gas turbine engine by virtue of improved specific fuel consumption.

25 Claims, 5 Drawing Sheets

GAS TURBINE DISK CAVITY INGESTION INHIBITOR

BACKGROUND OF THE INVENTION

This invention relates generally to improvements in gas turbine engines, particularly with respect to improved thermal isolation of turbine components from high temperature mainstream combustor gases. More specifically, this invention relates to an inhibitor that suppresses the flow of undesired hot gases from the main flow path into internal regions in the engine that are radially inboard of the turbine section main flow path.

Gas turbine engines are generally known in the art for use in a wide range of applications such as aircraft engines and auxiliary power units for aircraft. In a typical configuration, the engine includes a turbine section having a plurality of sets or rows of stator vanes and rotor blades disposed in an alternating sequence along the axial length of a hot gas flow path of generally annular shape. The rotor blades are mounted at the periphery of one or more rotor disks that are coupled, in turn, to a main engine shaft. Hot combustion gases are delivered from an engine combustor to the annular hot gas flow path, resulting in rotary driving of the turbine rotor disks which, in turn, drives the compressors and gearbox.

In most gas turbine engine applications, it is desirable to regulate the normal operating temperature of certain turbine components in order to prevent overheating and potential mechanical failures attributable thereto. That is, while the engine stator vanes and rotor blades are specially designed to function in the high temperature environment of the mainstream hot gas flow path, other turbine components such as the rotor disks are not designed to withstand such high temperatures. Accordingly, in many gas turbine engines, the volumetric space disposed radially inwardly or internally from the hot gas flow path comprises an internal engine cavity through which a cooling air flow is provided. The cooling air flow is normally obtained as a bleed flow from a compressor or compressor stage forming a portion of the gas turbine engine. The thus cooled internal engine cavity results in maintaining the normal steady state temperature of the rotor disks and other internal engine components at or below a selected temperature.

In the past, a relatively high amount of cooling air flow has been required to obtain satisfactory temperature control of engine components within the cooled internal engine cavity. Because use of compressor air for cooling is a performance penalty to the engine, it is highly desirable to employ methods to minimize this cooling air. The demand for cooling air has been significantly impacted by the leakage of cooling air from the internal cavity and through the space between adjacent rows of stator vanes and rotor blades, into the hot gas flow path. In addition, the demand for cooling flow has been affected by a somewhat irregular and unpredictable ingestion of mainstream hot gases from the hot gas flow path into the internal engine cavity. Various attempts to prevent flow between adjacent stator vanes and rotor blades have primarily involved the use of overlapping lip-type structures in close running clearance, often referred to as flow discouragers, but these structures have not been satisfactorily effective in preventing hot gas ingestion.

A variety of alternative baffle-type structures and techniques have been proposed, in addition to traditional flow discouragers, in efforts to minimize hot gas ingestion into the internally cooled cavity of a gas turbine engine. Such alternative approaches have included pockets of complex shape, some of which receive separate flows of cooling gas, to prevent hot gas ingestion. In the past, these techniques have been generally ineffective, or have otherwise required structures of complex shape and/or complex mounting arrangements at the time of initial engine production.

Information relevant to attempts to provide cooling air to minimize exposure of various engine components to elevated temperatures can be found in U.S. Pat. Nos. 1,819,864; 2,858,101; 3,535,873; 3,609,057; 5,466,123; 6,089,822; and 6,109,867. However, further improvements in minimizing hot gas ingestion are desirable to enhance durability and engine performance, since none of the previous inventions has been successful at eliminating hot gas ingestion into internally cooled cavities, and some suffer from one or more of the following disadvantages:

a) no work extraction is possible from the cooling air.

b) the cooling air released into the turbine disk forward cavity is not oriented specifically to the forward turbine disk surface.

c) the cooling air does not inhibit ingestion of the hot flow path gases.

d) hot flow path gases enter the turbine disk forward cavity and are then diluted by a coolant flow. The diluted, but somewhat heated air is then used for cooling purposes.

e) cooling air jets are not oriented to discharge the spent cooling air at the flow path high pressure locations associated with airfoil trailing edges.

f) cooling air flow is metered and delivered to the turbine cavity but no effort is made to directly counteract the ingestion of hot gases into the turbine cavity.

Ho et al., U.S. Pat. No. 5,545,004 assigned to the assignee of this application, disclose a recirculation pocket having a contoured shroud adapted for quick and easy installation at the time of initial engine production, wherein the contoured shroud captures ingested hot gases for effective recirculation into the main hot gas flow path of the engine. However, these recirculation pockets add weight and cost to an engine.

For the foregoing reasons, there is a need for a simple device that inhibits the flow of hot gas into cavities in the turbine sections of gas turbine engines.

SUMMARY OF THE INVENTION

The present invention fulfills the above need and specifically provides the following additional benefits:

a) because of the simplicity of the design, a gas turbine disk cavity ingestion inhibitor system can be readily incorporated on new design engines or it can be economically retrofitted on existing engines.

b) incorporation of a gas turbine disk cavity ingestion inhibitor system will minimize the volume of cooling air flow required to purge turbine disk cavities from ingested hot flow path gases.

c) component life will improve as a result of reduced degradation caused by exposure of metals to excessively hot gas flow.

d) engine performance will be enhanced by virtue of the reduced chargeable cooling core flow, resulting in an improvement in specific fuel consumption.

Turbine engine combustion air is directed through a nozzle ring, which accelerates the hot flow path gases to the proper conditions for the turbine rotor to extract work from the gas. Since the nozzle ring is a stationary part and the rotor is a rotating part, a necessary axial and radial gap exists between these parts, allowing hot gas flow to enter the disk cavity. If enough hot gas enters the disk cavity, the mixed mean temperature of the turbine disk cavity will rise to a temperature which will cause component failure. Typical measures employed in the past to minimize hot gas entry into the disk cavity include introduction of significant amounts of disk cavity cooling purge air, as well as employment of flow discouragers. The latter are comprised of overlapping lip-type structures, protruding from the stationary nozzle ring and the rotating turbine blades, and being in close running clearance to each other. Due to periodic high pressure fields that occur in the area of the turbine nozzle airfoil, these measures have been insufficient to fully overcome the flow of hot gases into the disk cavity at certain circumferential locations.

An object of the present invention is to provide a supplemental system to minimize hot gas ingestion into the circumferential locations of turbine disk cavities, where high pressure fields are experienced. The present invention achieves this object by providing a simple set of cooling air holes located on each side of the turbine nozzle stator airfoil trailing edge, and proximately placed to be below the turbine nozzle flow discouragers. Turbine disk cavity cooling purge air entering the disk cavity through the cooling air holes produces dynamic pressure cooling air jets which force the incoming hot ingestion air to turn circumferentially and go back out in the flow path before it enters the turbine disk cavity. The result is a decrease in hot gas ingestion and a reduction in disk rotor and static structural metal temperatures.

A second object of the present invention is to decrease the necessary cooling air flow required to purge turbine disk cavities from ingested hot flow path gases, and thereby improve engine performance. This further objective is achieved by the cooling air provided by ingestion inhibiting dynamic jets, because hot flow path gases are redirected back into the flow path at the point of ingestion thereby necessitating less cooling air flow volume to maintain tolerable temperatures within the turbine disk cavity. Engine performance is correspondingly improved by virtue of an improvement in specific fuel consumption resulting from reduced chargeable cooling flows.

These and other objects, features and advantages of the present invention are specifically set forth in or will become apparent from the following detailed description of a preferred embodiment of the invention when read in conjunction with the accompanying drawings.

DETAILED DESCRIPTION OF THE INVENTION

Figure 1:
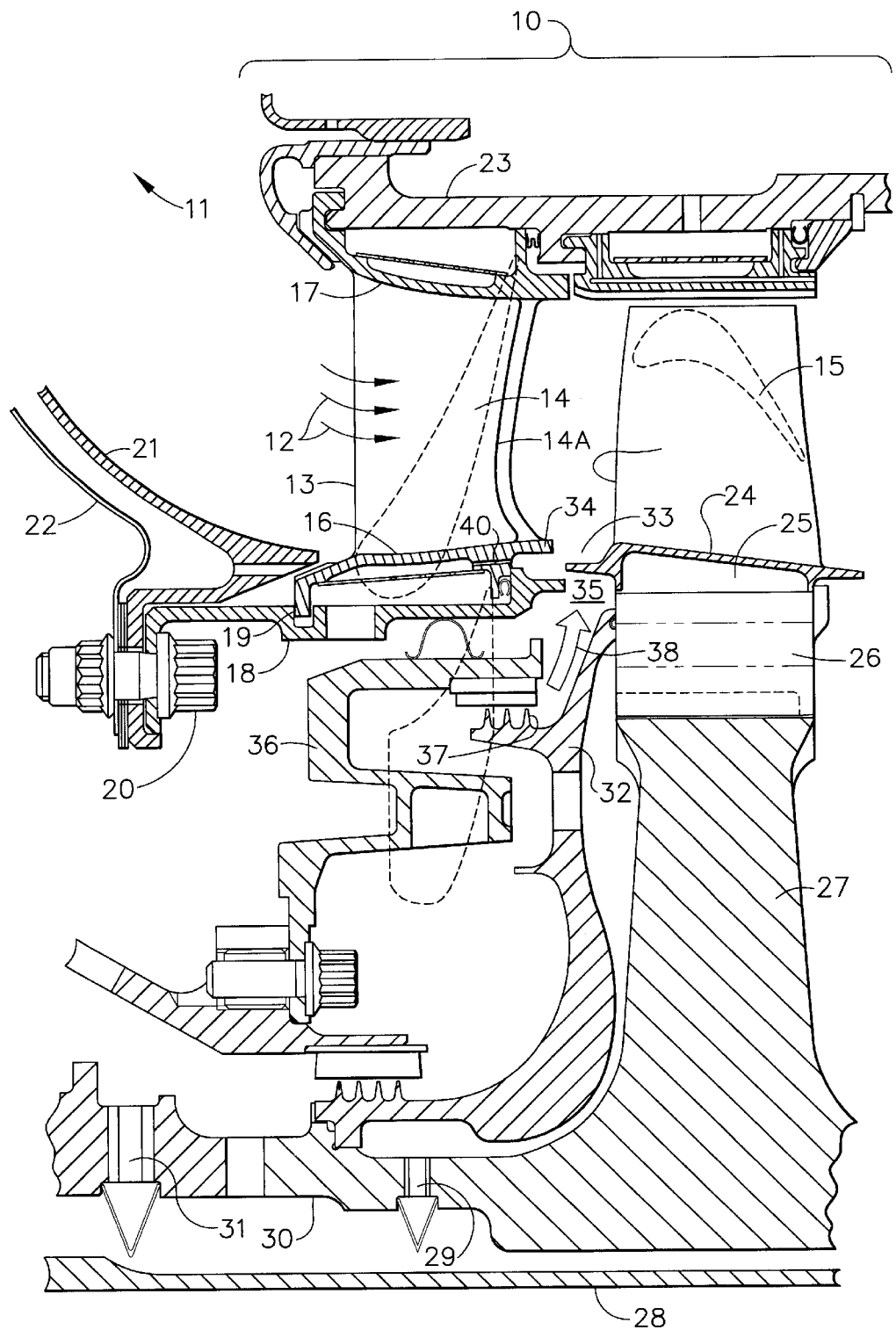
FIG. 1 is a partial cross-section of a typical turbine section of a gas turbine engine that can employ an ingestion inhibitor as contemplated by the present invention.

Referring to FIG. 1, the first stage turbine section of a typical gas turbine engine is generally denoted by reference numeral 10. In operation, hot gas, represented by arrows 12, flows from the engine's combustor 11, (only the exit of which is shown) to the turbine nozzle 13, comprised of a circumferential row of stator vanes 14 and then through a circumferential row of rotor blades 15. The stator vanes 14 and rotor blades 15 are formed from suitable turbine blade material capable of withstanding (with adequate cooling) the high gas temperatures. As shown, the stator vanes 14 project radially outwardly from an inner circumferential end wall 16 to an outer circumferential end wall 17. These end walls are preferably segmented. The inner circumferential end wall 16 is mounted to a retaining ring 18 with a connector flange 19 extending radially inwardly therefrom for convenient assembly by bolts or rivets 20 to a combustor wall 21 and combustor outer baffle 22. The outer circumferential end wall 17 is mounted to a turbine housing 23 in a manner familiar to those skilled in the art. The turbine rotor blades 15 project radially outward from inner turbine rotor circumferential platforms 24. Radially inward from the inner turbine rotor circumferential platforms 24 are the turbine blade roots 25 which are adapted for appropriate connection to the turbine disk post 26 at its periphery. The turbine disk 27 circumscribes a shaft 28 and is coupled by a turbine disk curvic coupling 29 to a stub shaft 30 which is turn is coupled to a compressor disk also by a compressor disk curvic coupling 31.

Still referring to FIG. 1, the forward seal rotor 32, and the turbine blade flow discourager 33 and the seal support 36, are spaced from the retaining ring 18 and the seal support 36 to define the turbine disk cavity 35. Labyrinth seals 37 are mounted between the seal support 36 and the forward seal rotor. Cooling air flow, represented by arrow 38, obtained as bleed flow from a compressor or compressor stage, is routed to the turbine disk cavity 35 to purge and maintain a normal steady state temperature of the components surrounding the forward turbine disk cavity 35. A singular ingestion inhibiting dynamic jet 40, according to the preferred embodiment, is shown on one side of the stator airfoil trailing edge 14A under the nozzle flow discourager 34. Its location, function and geometry will be clearly understood by reference to the following detailed description.

Figure 2:
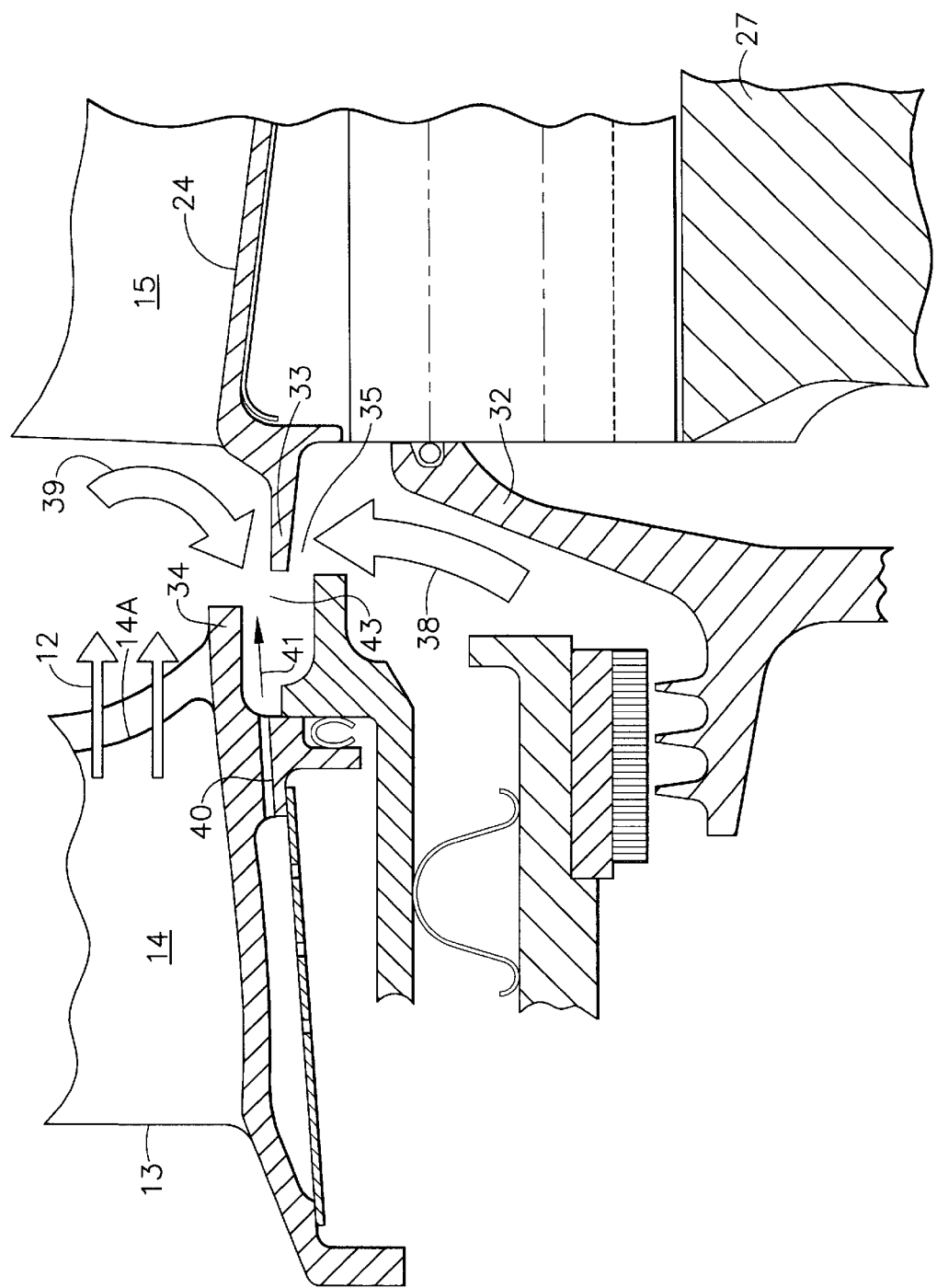
FIG. 2 is an enlarged cross section of the forward turbine disk cavity and immediately surrounding structural elements, specifically illustrating the location and orientation of an ingestion inhibiting dynamic jet as contemplated by the present invention.

FIG. 2 is an enlarged cross section of the turbine disk cavity 35 and immediately surrounding static and dynamic structural elements, including the forward seal rotor 32, the turbine blade flow discourager 33, and the turbine nozzle flow discourager 34. Cooling air flow 38 is provided to purge the turbine disk cavity 35 of hot gas flow 12. The cooling air flow 38 is directed to exit the turbine disk cavity 35 by traversing around the turbine blade flow discourager 33 and turbine nozzle flow discourager 34, and thereafter merging with the combustor hot gas flow 12. Although the net flow of the cooling air 38 is from the turbine disk cavity 35 into the combustor hot gas flow 12 path, extensive computational fluid dynamics analysis has shown that a circumferential pressure distribution, having varying high and low pressure fields, is developed at the stator airfoil trailing edge 14A. The analysis reveals that high pressure areas are located near the region of the stator airfoil trailing edge 14A. At these locations, the hot gas flow 12 will be driven into the turbine disk cavity 35, as shown by the hot gas ingestion 39 arrow.

As a result, hot gas flow 12 mixes with the cooling air flow 38 within the turbine disk cavity 35 to produce a mixed mean cavity temperature, which heats up the turbine rotor blades 15 and turbine disk 27 and surrounding static structural parts. This resulting increase in metal temperatures has been responsible for premature degradation of turbine nozzle flow discouragers 34, retaining rings 18, forward seal rotors 32, turbine blade flow discouragers 33, and turbine disk posts 26.

Still referring to FIG. 2, there is shown one ingestion inhibiting dynamic jet 40 cooling hole. It is located on one side of the stator airfoil trailing edge 14A and just below the turbine nozzle flow discourager 34. In the preferred embodiment of the invention, a plurality of ingestion inhibiting dynamic jet 40 cooling holes are located on both sides of each stator airfoil trailing edge 14A. The pressure of the dynamic jet air flow 41 proceeding from the ingestion inhibiting dynamic jet 40 forces the incoming hot gas ingestion 39 to turn circumferentially and go back out into the path of hot gas flow 12, before it can enter the turbine disk cavity 35. The ingestion inhibiting dynamic jet 40 cooling holes are aimed in the general direction of the incoming hot gas ingestion 39, to a point 43 approximately midway within radial gap between the turbine blade and turbine nozzle flow discouragers.

Figure 3:
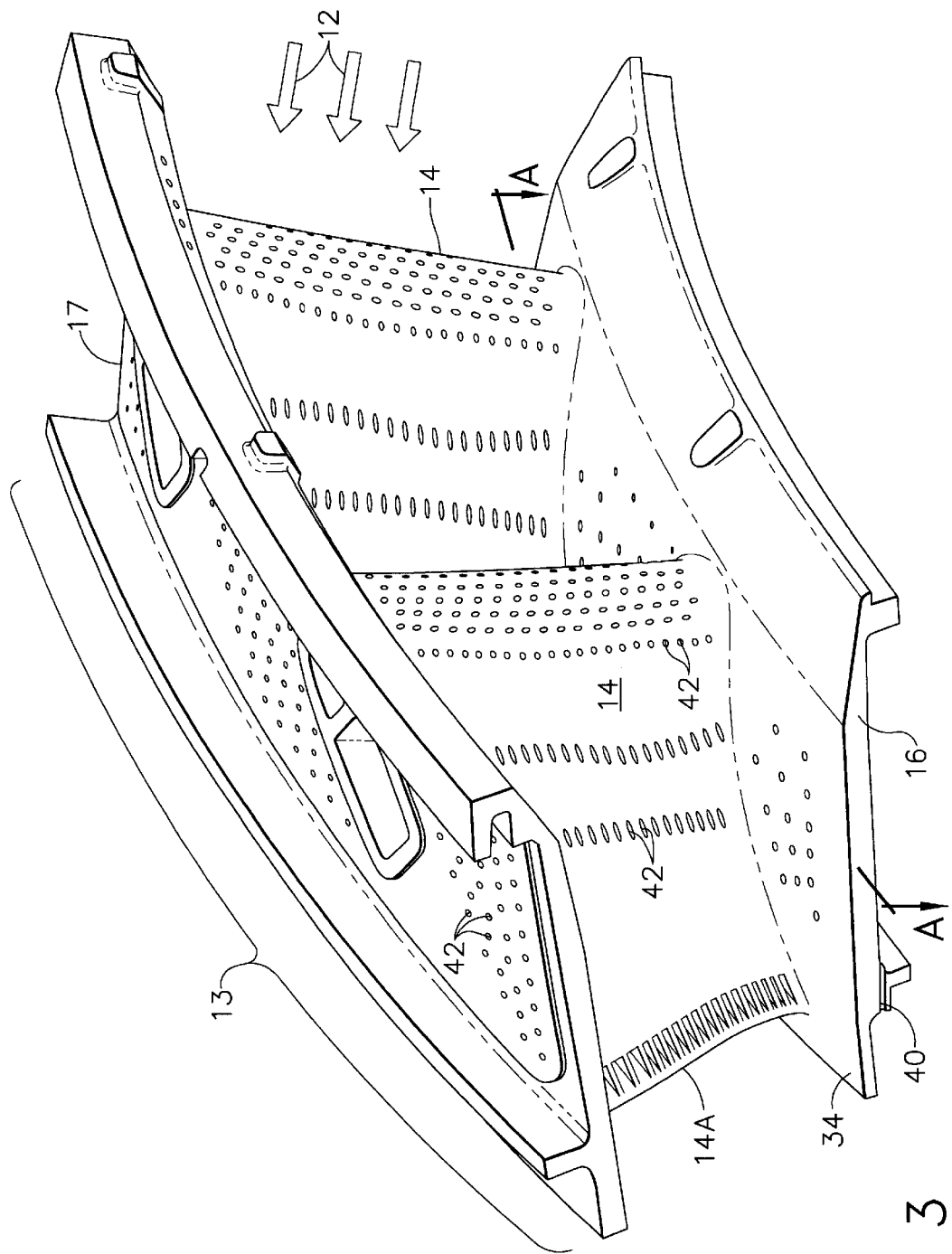
FIG. 3 is a perspective view of a stator segment of a turbine section having an ingestion inhibiting dynamic jet as contemplated by the present invention.

FIG. 3 is a perspective view of a stator segment of a turbine nozzle 13 section having an ingestion inhibiting dynamic jet 40 as contemplated by the present invention. Two stator vane airfoils 14 are shown rigidly secured between the inner circumferential end wall 16 and outer circumferential end wall 17. Hot gas flow 12 is accelerated by a plurality of the stator vane airfoils 14 to the proper conditions for the turbine rotor to extract work from the gases. Cooling air holes 42 are provided on the exposed surfaces of the stator vane airfoils 14, inner circumferential end wall 16, and outer circumferential end wall 17 to maintain metal temperatures at tolerable levels. One ingestion inhibiting dynamic jet 40 is illustrated on the outboard side of the stator airfoil trailing edge 14A and just below the turbine nozzle flow discourager 34.

Figure 4:
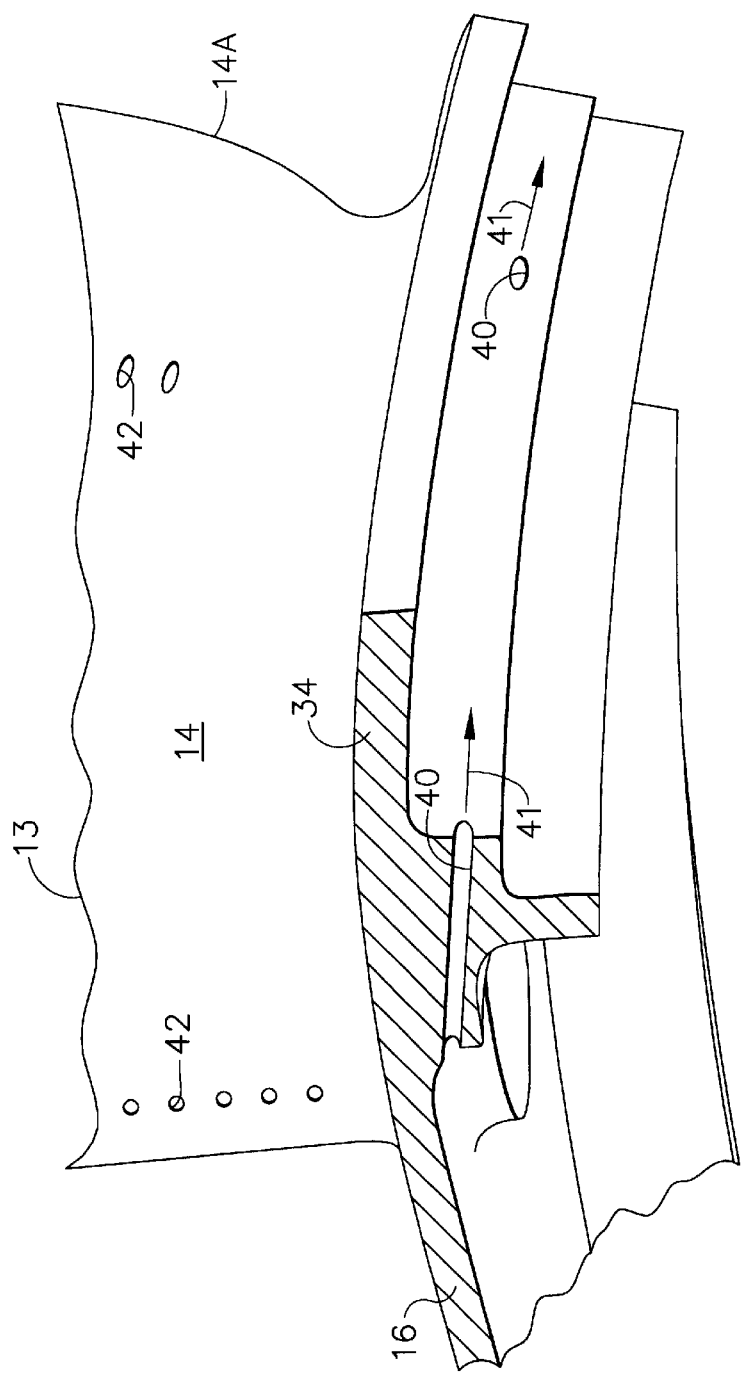
FIG. 4 is a perspective view from the inboard side of a stator segment, looking radially outboard, and showing the direction and orientation of ingestion inhibiting dynamic jet holes as contemplated by the present invention.

FIG. 4 is still another perspective view from axially aft of a stator segment of a turbine nozzle 13, looking radially outward, and illustrating the geometric configuration and orientation of two ingestion inhibiting dynamic jet 40 holes penetrating through the turbine nozzle flow discourager 34. For clarity of illustration, only one ingestion inhibiting dynamic jet 40 is shown on each side of the stator airfoil trailing edge 14A. For the preferred embodiment, a plurality of ingestion inhibiting dynamic jets 40 is located on either side of each stator airfoil trailing edge 14A. The dynamic jet air flow 41 is directed from each ingestion inhibiting dynamic jet 40 to the turbine disk cavity 35 where it will inhibit entry of hot gas ingestion 39.

Figure 5:
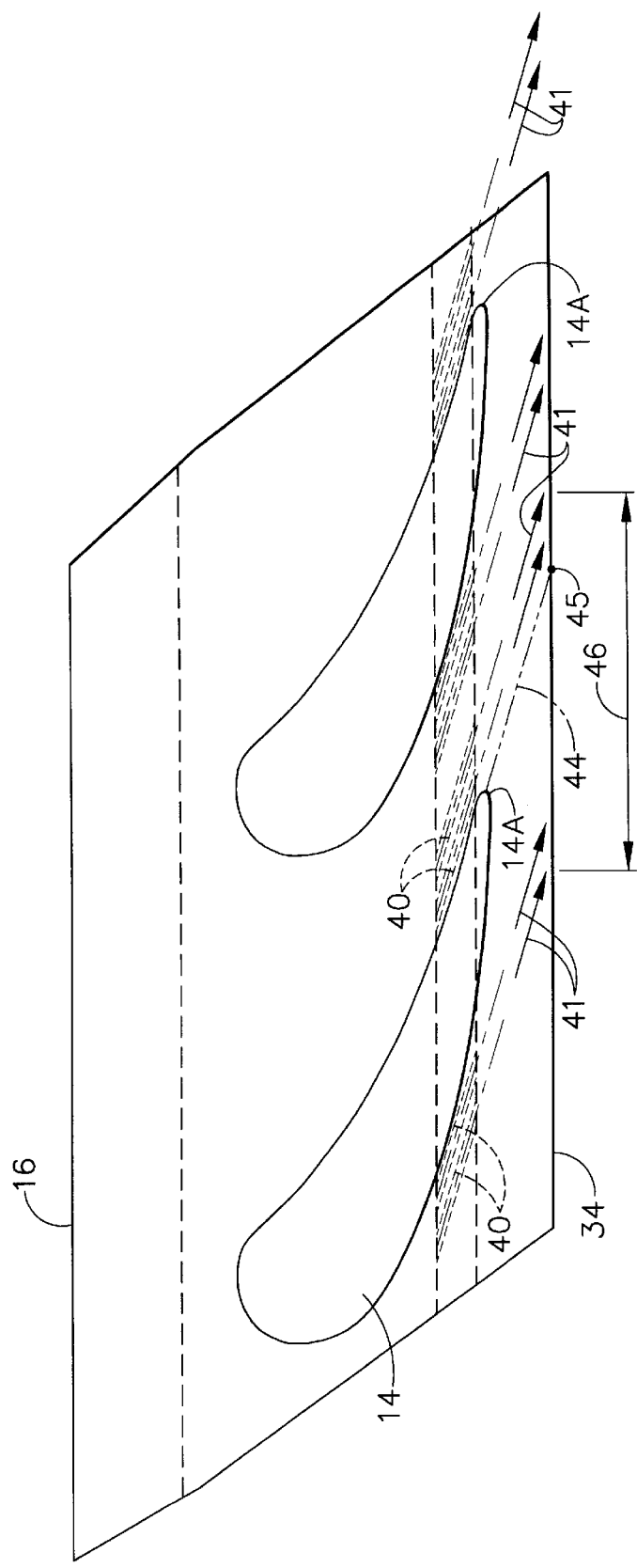
FIG. 5 is a plane view of the stator inner circumferential end wall, taken on line A—A of FIG. 3, and showing the geometric orientation of ingestion inhibiting dynamic jets.

FIG. 5 is a plane view of the stator inner circumferential end wall 16, taken on line A—A of FIG. 3, as viewed from the hot gas flow 12 path looking radially inboard on the turbine nozzle 13. It illustrates the geometric orientation of ingestion inhibiting dynamic jets 40.

Two ingestion inhibiting dynamic jet 40 holes are shown located on each side of the stator airfoil trailing edge 14A. The centerline of each ingestion inhibiting dynamic jet 40 is located approximately parallel to the airfoil trailing edge flow direction. For the preferred embodiment, the general direction can be determined by extending an imaginary line 44 in the airfoil trailing edge flow direction from the trailing edge of the airfoil to a point 45 where it intersects the trailing edge of the turbine nozzle flow discourager 34. The circumferential positioning of the ingestion inhibiting dynamic jet 40 holes is approximately within a length, represented by dimension 46, which is approximately equivalent to between ¼ and ½ of the stator airfoil's 14 pitch.

Various numbers of ingestion inhibiting dynamic jet 40 holes can be used. The specific number will depend on the results of computational fluid dynamics analysis performed for each gas turbine engine configuration to determine circumferential pressure distributions developed at the turbine nozzle 13. Typically, between 1 and 8 ingestion inhibiting dynamic jet 40 holes will be utilized per airfoil. For small gas turbine engines, hole diameters of ingestion inhibiting dynamic jets 40 are approximately 0.010 to 0.030 inches. For larger gas turbine engines, hole diameters would be expected to increase.

In an alternate embodiment, the direction of the ingestion inhibiting dynamic jet 40 holes can also be altered slightly to satisfy specific gas turbine engine geometries, while still providing the benefits of inhibiting hot flow gas ingestion. For still another alternate embodiment, the orientation of the ingestion inhibiting dynamic jet 40 holes may also have a radial component, which would direct the dynamic jet air flow 41 onto the turbine nozzle flow discourager 34 for improved turbine nozzle 13 trailing edge cooling.

Although the present invention has been described in considerable detail with reference to certain preferred versions thereof, other versions are possible. Therefore, the spirit and scope of the appended claims should not be limited to the description of the preferred versions contained therein.

It should be understood, of course, that the foregoing relates to preferred embodiments of the invention and that modifications may be made without departing from the spirit and scope of the invention as set forth in the following claims.

We claim:

1. A supplemental air cooling system, for use in gas turbine engines having hot gas flow discouraging structural elements, to inhibit ingestion of hot gas flow into certain circumferential locations of turbine disk cavities, said air cooling system comprising:

a plurality of ingestion inhibiting dynamic jet orifices located on an underside of turbine nozzle trailing edges;

said orifices penetrating through turbine nozzle hot gas flow path discouraging structural elements;

said orifices being optionally located on each side of each stator blade airfoil trailing edge, or directly underneath each stator blade airfoil trailing edge;

the centerline of each said orifices directed to a point within the turbine disk flow discourager cavity;

said point being located about midway between the stationary turbine nozzle and the rotating turbine blade hot flow path gas discouraging structural elements;

a flow of gas turbine engine cooling air traversing through said plurality of ingestion inhibiting dynamic jet orifices and flowing into the turbine disk flow discourager cavity;

whereby the dynamic pressure of cooling air traversing through the plurality of ingestion inhibiting dynamic jet orifices and into the turbine disk flow discourager cavity, forces incoming hot flow gases to turn circumferentially and go back out into the path of hot gas flow before it can cause an adverse increase in internal component temperatures.

2. The supplemental air cooling system of claim 1, wherein the general direction of the centerline of each ingestion inhibiting dynamic jet cooling air orifice is determined by extending an imaginary line in the airfoil trailing edge flow direction from the turbine nozzle stator blade trailing edge airfoil to a point where it intersects the trailing edge of the turbine nozzle flow discouraging structure.

3. The supplemental air cooling system of claim 1, wherein the ingestion inhibiting dynamic jet cooling air orifices are positioned circumferentially to approximately encompass a length which is about equivalent to between ¼ and ½ of the turbine stator airfoil pitch.

4. The supplemental air cooling system of claim 1, wherein the general direction of the centerline of each ingestion inhibiting dynamic jet cooling air orifice has a radial component to direct the airflow for improved turbine nozzle trailing edge cooling.

5. The supplemental air cooling system of claim 1, wherein between one to eight ingestion inhibiting dynamic jet cooling air orifices are optionally placed adjacent to each side of each stator airfoil trailing edge, or directly underneath each stator airfoil trailing edge.

6. The supplemental air cooling system of claim 1, wherein the ingestion inhibiting dynamic jet orifice diameter is about 0.010 to 0.030 inches.

7. A supplemental air-cooling system, for use with hot flow path gas discouragers in a gas turbine engine, to inhibit ingestion of hot gas flow from a combustor hot gas flow into turbine disk cavities, said air-cooling system comprising:

a plurality of ingestion inhibiting dynamic jet orifices located radially inward of a turbine nozzle hot flow path gas discourager lip, said orifices penetrating through said turbine nozzle hot flow path gas discourager; and a flow of cooling air traversing through said orifices and flowing between said turbine nozzle discourager lip and a rotating turbine blade hot flow path gas discouraging lip, such that, the dynamic pressure of said cooling air and said discourager lips, direct hot gas flow entering said discourager, towards said combustor hot gas flow and away from said turbine disk cavities.

8. The supplemental air-cooling system of claim 7, wherein said cooling air is directed to a point located substantially midway between an outward lip of a turbine nozzle hot flow path gas discourager and a rotating turbine blade hot flow path gas discouraging lip.

9. The supplemental air-cooling system of claim 7, wherein said orifices are located on opposite sides of a stator blade airfoil trailing edge.

10. The supplemental air-cooling system of claim 7, wherein said orifices are located radially inward of a stator blade airfoil trailing edge.

11. The supplemental air-cooling system of claim 7, wherein the general direction of the centerline of each ingestion inhibiting dynamic jet cooling air orifice is determined by extending an imaginary line from a turbine nozzle stator blade airfoil trailing edge flow direction, to a point where it intersects the trailing edge of a lip of the turbine nozzle flow discouraged.

12. The supplemental air cooling system of claim 7, wherein said orifices are positioned circumferentially to approximately encompass a length which is about equivalent to between ¼ and ½ of the turbine stator airfoil pitch.

13. The supplemental air cooling system of claim 7, wherein the general direction of the centerline of each orifice has a radial component to direct the airflow for improved turbine nozzle trailing edge cooling.

14. The supplemental air cooling system of claim 7, wherein between one to eight ingestion inhibiting dynamic jet cooling air orifices are optionally placed adjacent to each side of each stator airfoil trailing edge, or directly underneath each stator airfoil trailing edge.

15. A supplemental air-cooling system, for use with hot flow path gas discouragers in gas turbine engines, to inhibit the ingestion of hot gas flow from a combustor hot gas flow into turbine disk cavities, said air-cooling system comprising:

a plurality of ingestion inhibiting dynamic jet orifices located radially inward of a turbine nozzle hot flow path gas discourager lip, said orifices penetrating through said turbine nozzle hot flow path gas discourager; and a flow of cooling air traversing through said orifices and directed to a point located substantially midway between an outward lip of a turbine nozzle hot flow path gas discourager and a rotating turbine blade hot flow path gas discouraging lip, such that, the dynamic pressure of said cooling air and said discourager lips, direct hot gas flow entering said discourager towards said combustor hot gas flow and away from said turbine disk cavities, wherein one to eight orifices are optionally located on each side of each stator blade airfoil, or directly radially inward of each stator blade airfoil trailing edge.

16. The supplemental air-cooling system of claim 15, wherein the general direction of the centerline of each ingestion inhibiting dynamic jet cooling air orifice is determined by extending an imaginary line in a stator blade airfoil trailing edge flow direction from a turbine nozzle stator blade trailing edge airfoil, to a point where it intersects the trailing edge of the outward lip of the turbine nozzle flow discourager.

17. The supplemental air cooling system of claim 15, wherein said orifices are positioned circumferentially to approximately encompass a length which is about equivalent to between ¼ and ½ of the turbine stator airfoil pitch.

18. The supplemental air cooling system of claim 15, wherein the general direction of the centerline of each orifice has a radial component to direct the airflow for improved turbine nozzle trailing edge cooling.

19. A method for inhibiting the ingestion of a combustor hot gas flow, into a turbine disk cavity having hot flow path gas discouragers, comprising:

disposing a plurality of cooling air orifices, such that, said orifices penetrate through a turbine nozzle hot flow path gas discourager, and said orifices are radially inward of a turbine nozzle hot flow path gas discourager lip;

traversing a flow of cooling air through said orifices; and directing said cooling air between said turbine discourager lip and a rotating turbine blade hot flow path gas discouraging lip, such that the dynamic pressure of the cooling air directs hot gases entering said discouragers towards said combustor hot gas flow and away from said turbine disk cavities.

20. The method of claim 19 wherein said step of disposing a plurality of cooling air orifices comprises:

determining a turbine stator airfoil's pitch; and circumferentially disposing said plurality of cooling air orifices such that said orifices approximately encompass a length equivalent to between ¼ and ½ of said turbine stator airfoil pitch.

21. The method of claim 19 wherein said step of disposing a plurality of cooling air orifices comprises:

extending an imaginary line in the airfoil trailing edge direction, from the turbine nozzle stator blade trailing edge airfoil, to a point where said imaginary line intersects the trailing edge of said turbine discourager lip; and directing the centerline of each orifice, in the general direction of said intersection of said imaginary line and said trailing edge of said turbine discourager lip.

22. The method of claim 19 wherein said step of disposing a plurality of cooling air orifices comprises:

determining the centerline of each orifice; and directing said centerline in a radial direction.

23. The method of claim 19 wherein said step of disposing a plurality of cooling air orifices comprises:

determining circumferential sides of a stator airfoil trailing edge; and disposing one to eight orifices on each of said sides of said stator airfoil.

24. The method of claim 19 wherein said step of disposing a plurality of cooling air orifices comprises:

determining an underside of a stator airfoil trailing edge; and disposing one to eight orifices radially inward of said stator airfoil trailing edge.

25. A method of conveying cooling air for use in gas turbine engines, having hot gas flow discouraging structural elements, to inhibit the ingestion of hot flow path gases into certain circumferential locations of turbine disk cavities, said air conveyance method comprising:

conveying said cooling air flow to a point within a turbine disk flow discourager cavity located about midway between a stationary turbine nozzle and a rotating turbine blade hot flow path gas discouraging structural elements; and directing said cooling air into the turbine disk flow discourager cavity, wherein the dynamic pressure of the cooling air, forces incoming hot flow gases to turn circumferentially and return to the path of hot gas flow before it can cause an adverse increase in internal component temperatures.

* * * * *